(12) United States Patent
Wary

(10) Patent No.: US 8,714,633 B2
(45) Date of Patent: May 6, 2014

(54) HONEYCOMB-STRUCTURED FLOOR PANEL FOR A VEHICLE INCORPORATING A FASTENER ELEMENT

(75) Inventor: Alain Wary, Saint Andiol (FR)

(73) Assignee: Airbus Helicopters, Marignane Cedex (FR)

( * ) Notice: Subject to any disclaimer, the term of this patent is extended or adjusted under 35 U.S.C. 154(b) by 425 days.

(21) Appl. No.: 12/910,931

(22) Filed: Oct. 25, 2010

(65) Prior Publication Data

US 2011/0095572 A1 Apr. 28, 2011

(30) Foreign Application Priority Data

Oct. 28, 2009 (FR) ...................................... 09 05172

(51) Int. Cl.
*B62D 27/02* (2006.01)
(52) U.S. Cl.
USPC .................................. 296/193.07; 296/184.1
(58) Field of Classification Search
USPC ...................... 296/193.07, 184.1, 65.13, 191; 410/104, 115; 52/403.1; 105/396; 244/137.1, 118.6
See application file for complete search history.

(56) References Cited

U.S. PATENT DOCUMENTS

| 6,219,983 | B1 * | 4/2001 | Gråkjaar Jensen et al. .. 52/403.1 |
| 7,350,853 | B2 * | 4/2008 | Fitze ......................... 296/193.07 |
| 2009/0026804 | A1 * | 1/2009 | Ciprian ......................... 296/191 |

FOREIGN PATENT DOCUMENTS

| CA | 2266710 A1 | 3/1999 |
| DE | 10110996 A1 | 9/2002 |
| FR | 2891239 A1 | 3/2007 |
| WO | 9942350 A1 | 8/1999 |

OTHER PUBLICATIONS

Search Report and Written Opinion; Application No. FR 09 05172; dated Jun. 9, 2010.

* cited by examiner

*Primary Examiner* — Joseph Pape
(74) *Attorney, Agent, or Firm* — Brooks Kushman P.C.

(57) ABSTRACT

The invention provides a laminated floor panel for a vehicle cabin. The panel comprises a core (1) shaped as a honeycomb and wrapped in outside metal walls (2, 3, 4). A fastener element (5) for fastening vehicle cabin equipment is set back in the panel, being made integrally in a traffic wall (2) of the panel by machining, the traffic wall (2) being derived from a metal plate (9) from which the fastener element (5) and the side walls (4) of the panel are formed by removing material from the metal plate (9).

17 Claims, 2 Drawing Sheets

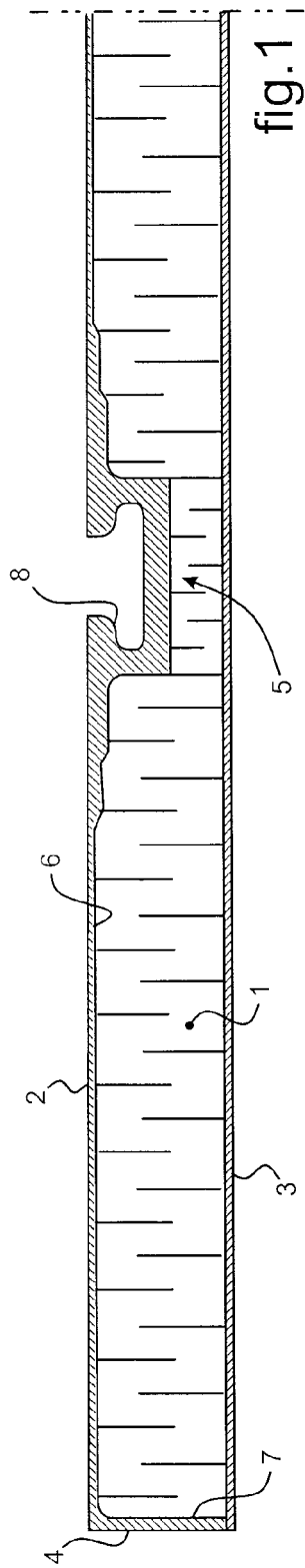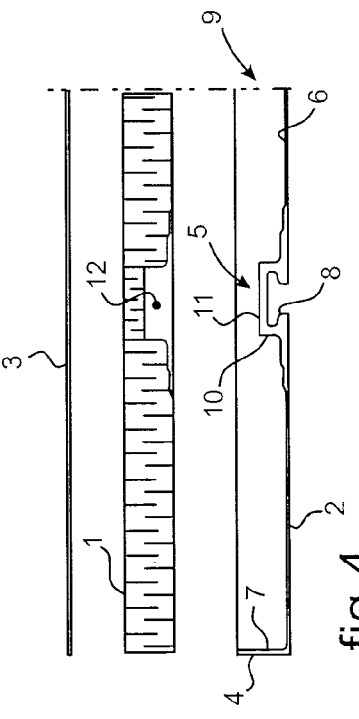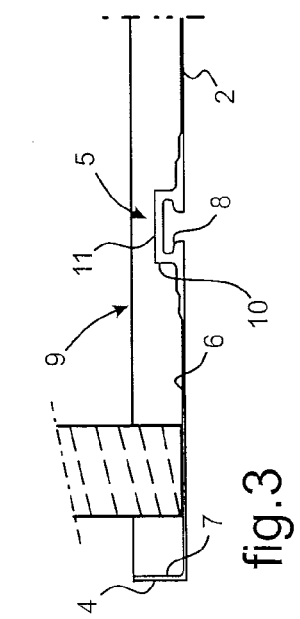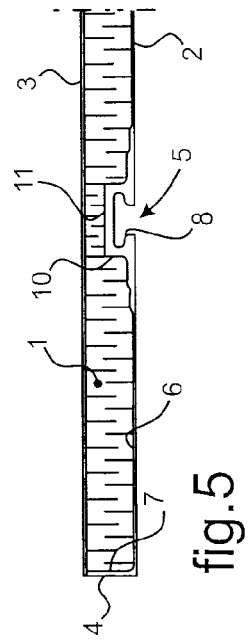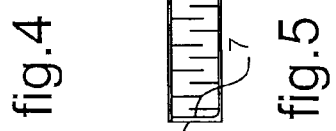

HONEYCOMB-STRUCTURED FLOOR PANEL FOR A VEHICLE INCORPORATING A FASTENER ELEMENT

CROSS REFERENCE TO RELATED APPLICATION

This application claims the benefit of application no. FR 09 05172, filed Oct. 28, 2009, the disclosure of which is incorporated herein by reference.

FIELD OF THE INVENTION

The invention relates to the field of providing vehicle cabins, in particular for flying vehicles such as aircraft, rotorcraft, airplanes, or other similar flying vehicles. More particularly, the present invention relates to providing floors in such vehicles, which floors are laminated are of a honeycomb structure and incorporate fastener elements for use in fastening vehicle equipment, such as seats, for example.

BACKGROUND OF THE INVENTION

In the field of fitting out vehicle cabins, and more particularly rotorcraft cabins, it is common practice to make the floor from panels that are arranged in a laminated structure. The panel structure comprises a core of honeycomb configuration that is confined inside a metal enclosure forming the outside walls of the panel. The enclosure is defined between outside metal walls that are placed around the honeycomb core in order to protect it and that form opposite planes, respectively a support plane for supporting the panel and a traffic plane for supporting traffic inside the vehicle cabin. Since the floor has the potential of supporting cabin equipment, such as seats for example or any other useful equipment, it is common practice to incorporate fastener elements for such equipment in the structure of the floor. Such a fastener element is commonly arranged as an elongate member for locally receiving complementary fastener elements fitted to the equipment. Specifically, such a fastener elements are arranged as a rail or the like projecting on the outside wall of the floor that forms the traffic plane, or conversely is arranged as a slideway or the like formed in the inside volume of the floor as defined by the enclosure.

For information about an environment close to the present invention, reference may be made to WO 99/42350 (ABB Daimler Benz Transp et al.); U.S. Pat. No. 6,219,983 (Daimler Chrysler Rail Systems); and FR 2 891 239 (Airbus France).

Document CA 2 266 710 describes a wall provided with two panels with honeycomb thermal insulation being placed between them. That wall also includes extruded section members for attaching equipment.

Under such conditions, there arises the problem of incorporating the fastener element in the floor structure. In the specific context of flying vehicles, it is appropriate to avoid using common techniques for incorporating fastener elements, since they give rise to a significant increase in the weight of the floor, as opposed to usefully lightening the vehicle. It is desirable for the incorporated fastener element to enable any kind of equipment to be installed in positions that are as diverse as possible.

In particular, it is advantageous for the incorporated fastener element to enable the vehicle cabin to be fitted out depending on requirements, as a function of some specific arrangement desired for the cabin of a determined vehicle that is to be fitted out. Such adaptation of the floor to particular requirements needs to be made possible under cost conditions that are not insuperable for selling the floor and while avoiding making the structure of the floor excessively complex.

Also, it is appropriate to avoid incorporating fastener elements that are not used, particularly since too many such elements tend to weaken the floor. It is preferable for the presence of the fastener elements not to be uncomfortable in terms of freedom to move in the vehicle cabin. Furthermore, the fastener elements must be incorporated in the floor in a manner that is robust and long-lasting while not weakening the floor. In addition, fastener elements need to be incorporated in a manner that compiles with safety constraints relating to the ability of the floor to withstand deformation, which constraints are particularly severe for flying vehicles, which need to be crash-resistant.

SUMMARY OF THE INVENTION

One object of the present invention is to provide a floor panel in particular for a flying vehicle, more particularly for a rotorcraft. The panel is of a honeycomb structure and is laminated. It has outside metal walls and incorporates a vehicle equipment fastener element. The invention seeks more particularly to provide such a floor panel that affords a satisfactory solution to all of the above-mentioned constraints and difficulties.

The vehicle cabin floor in one embodiment is made from at least one laminated panel with a core in a honeycomb configuration that is wrapped in outside metal walls. A honeycomb structure covers any analogous cellular structure suitable for imparting appropriate robustness and deformation resistance to the core, while using as little weight as possible.

The outside metal walls define between them an enclosure for receiving the core. The panel incorporates at least one fastener element that is placed so as to be accessible from an outside face of a traffic wall of the panel. The term "traffic" wall of the panel is used to designate the wall of the floor on which passengers are to walk and/or pieces of vehicle cabin equipment are to be installed, such as seats or any other equipment that needs to be secured to the floor. The fastener element is suitable for co-operating with complementary fastener elements fitted to vehicle cabin equipment. The fastener element is arranged at least in part as a slideway, being located inside the volume formed by the enclosure defined by the outside walls of the panel. This positioning of the fastener element makes it possible at least to avoid discomfort concerning freedom of movement inside the vehicle cabin.

Preferably, the fastener element associated with the floor panel is machined integrally with the traffic wall of the panel.

The term "machined integrally with" means that both the fastener element and the traffic wall of the panel are formed by removing material from a plate from which the traffic wall is obtained. Such a machined integral structure is recognizable in that the integral structured elements that are obtained by machining, such as in the invention the fastener element and the traffic wall of the panel in particular, together form a one-piece unitary block of a single material from which matter has been removed in order to form the structural members individually. The removal of material may be performed equally well in a single machining operation or in successive machining stages formed during a plurality of machining operations.

More particularly, the traffic wall is obtained from a metal plate from which the fastener element is formed mainly by removing material from the metal plate. The fastener element has walls that define between them the slot of the slideway. The term "slideway" means an elongate member presenting a set-back profile, regardless of the shape of the profile. Such a set-back profile is more particularly suitable for co-operating with a projecting complementary profile shaped as a rail or the like and forming part of the complementary fastener element of equipment for installing on the floor of the vehicle cabin.

In a variant, such removal of material is obtained by machining the plate from its outside face that corresponds to the outside face of the traffic wall in order to form the slot of the slideway, and by machining the plate from its inside face, opposite from the preceding face, in order to form the bottom wall and the side walls of the slideway. In another variant, such removal of material is achieved by machining the plate from the inside face so as to dig out the slot of the slideway and form the side walls that define the slot. In order to form the bottom wall of the slot, a cap or analogous closure member is fitted to the edges of the side walls of the fastener element. It should be observed that the function of such a cap lies in closing off between the slot of the fastener element and the honeycomb core, without contribute to the actual function of the slot and of the fastener element in terms of fastening vehicle cabin equipment to the floor.

The traffic wall integral with the fastener element is constituted in particular by a one-piece metallic element made of a single material, from which material has been removed by machining in order to form at least the fastener element, and possibly also the side walls of the panel.

More particularly, the traffic wall is also integral by machining with the side walls of the enclosure, which side walls are advantageously formed by extending the machining operation that forms the bottom and the side walls of the fastener element. The side walls of the enclosure are formed by machining a plate from which the traffic wall is obtained. The fastener element and the traffic wall are formed jointly in at least one common machining stage by removing material from the plate from which the traffic wall is formed. The traffic wall, the walls of the fastener element, and the side walls of the panel constitute a one-piece unitary block that is advantageously formed during at least one stage of machining the plate that is common to all of them.

The traffic wall, extended by the side walls integral therewith defines the enclosure for receiving the core of the panel, the volume of the enclosure being circumscribed by the traffic wall extended by the side walls of the panel. The traffic wall preferably receives the honeycomb core that is fitted inside the enclosure and that is secured to the inside face of the traffic wall by bonding, e.g. using adhesive or an analogous technique, in particular. The honeycomb core preferably includes a housing for receiving the fastener element. By way of example, this housing is formed by machining a cellular plate from which the honeycomb core is formed. Also by way of example, the housing may be obtained by juxtaposing a plurality of cellular elements which together make up the honeycomb core. For example, such elements may comprise a middle element forming the bottom of the housing located between two respective lateral elements that form the side walls of the housing. The cellular elements may either be bonded to one another to form a one-piece honeycomb core prior to being installed inside the enclosure of the panel, or else they may be installed individually and bonded inside the enclosure.

It can be understood that the housing in the honeycomb core for receiving the fastener element may be formed equally well by machining the honeycomb core or by juxtaposing cellular elements to make up the honeycomb core.

The enclosure is closed in particular by a support bottom wall of the panel, which wall is opposite from the traffic wall, and is fitted to the enclosure and bonded thereto by adhesive, by welding, or by an analogous technique. More particularly, the bottom wall is fitted to press against the edges of the side walls of the enclosure, themselves extending the traffic wall.

The outside surfaces of the traffic wall and of the fastener element are optionally both covered in a common protective coating. Such a protective coating is of continuous extent, being obtained by means of a bath, by spraying, by heating a previously-deposited polymer, or by any other analogous technique. The continuous extent of the coating means that it is applied in a single step during production of the panel after the fastener element has been formed, and indeed and preferably after its side walls have been formed.

The invention also includes a method of making a vehicle floor panel as described above. The method consists in particular in forming a the fastener element by removing material from a plate constituting the traffic wall of the panel.

Advantageously, the operation of removing material to form the fastener element further includes the operation that consists in forming the side walls defining the enclosure for receiving the honeycomb core.

The slot in the fastener element is preferably a one-eyed slot so as to close off the space it defines in regards with the honeycomb core. In various variants that are mentioned by way of example, this slot is either machined from a face of the plate from which the traffic wall is obtained, and then material is removed from the opposite face of the plate in order to form the bottom of the one-eyed slot, or else the plate is machined from a single face to dig out the slot and form the side walls of the fastener element that define the slots, with the slots subsequently being closed by a cap that is fitted thereon and bonded thereto.

More particularly, in a variant, the operation of forming the fastener element consists more particularly in performing the following operations:

removing material from the plate from its outside face corresponding to the outside face of the traffic wall so as to provide a set-back portion in relief constituting a slot of the fastener element; and removing material from the plate from its inside face opposite from the preceding face in order to form a bottom wall and side walls of the fastener element.

More particularly, and in a variant, the operation of forming the fastener element consists more particularly in performing the following operations:

removing material from the plate from its inside face to form side walls of the fastener element and to provide a set-back portion in relief forming a slot of the fastener element; and closing the slot of the fastener element by fitting a cap that is bonded to the edges of the side walls of the fastener element to form a bottom wall of the fastener element.

Optionally, the method of the present invention includes an additional step of applying surface treatment to the outside face of the traffic wall, by covering it in a protective coating. This additional step is performed after machining the plate from which the traffic wall is obtained and before assembling the panel.

The panel of the present invention provides rigorous accuracy in the positioning and the dimensions of the fastener element which is obtained by machining the plate from which the traffic wall is obtained. Incorporating the fastener element by machining does not harm the integrity of the panel and does not weaken it, in particular by avoiding fitting any fastener members thereto. Incorporating the fastener element by machining the traffic wall provides robustness, reliability, and long life for its connection with the panel, in particular without affecting either the traffic wall or the structured honeycomb core.

The fastener element is formed in simple manner by machining, with a common machining step being used also to form side walls of the enclosure that receive the honeycomb core. The panel incorporating the fastener element machined integrally therewith is obtained at lower cost using tooling that is simple and avoiding the use of an assembly structure between the traffic wall and the fastener element. The adaptation of the panel and in particular the integration of the fastener element in function of any floor and equipments that might be desired depending on requirement for a given type of vehicle, are merely realized by modifying the machining program of a numerically-controlled machine that is used for forming the traffic wall that is integral with the fastener element.

Although it is set back in the volume of the floor, the fastener element constitutes a reinforcing member for the floor, and advantage may be taken thereof for complying with the safety requirements that need to be satisfied specifically by the floors of flying vehicles, in particular with respect to how they deform in the event of a crash.

BRIEF DESCRIPTION OF THE DRAWINGS

Embodiments of a floor panel for a vehicle cabin of the present invention are described with reference to the figures of the accompanying sheets, in which:

FIG. 1 is a fragmentary section view of a panel constituting an embodiment of the present invention;

FIGS. 2 to 5 are diagrams showing respective successive different steps in obtaining the panel shown in the preceding figure.

DETAILED DESCRIPTION OF THE PREFERRED EMBODIMENT

Figure 6:
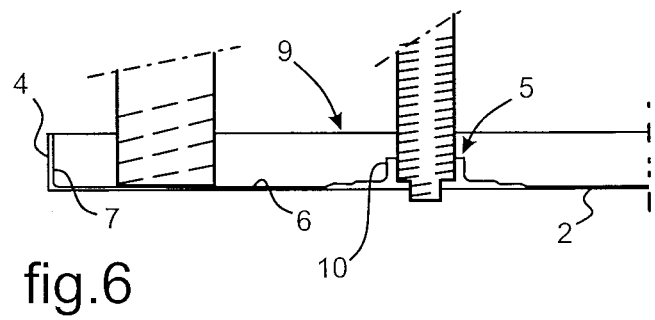
FIGS. 6 to 9 are diagrams showing respective successive different steps in obtaining a panel of the present invention in another embodiment.

In FIG. 1, a laminated panel is for use with other similar panels in making up the floor of a flying vehicle. The laminated panel mainly comprises a core 1 of cellular structure, commonly known as a honeycomb structure. The core 1 is located inside an enclosure of the panel, which enclosure is defined by metal walls, including a wall referred to as a traffic wall 2, a support wall 3 of the panel that is opposite from the traffic wall 2, and side walls 4 joining the traffic wall 2 and the support wall 3 together. The traffic wall 2 is the wall of the panel on which passengers walk and to which provision is made for securing pieces of equipment, such as seats or any other equipment of use for the cabin of the vehicle.

In order to anchor pieces of equipment to the floor of the vehicle, the panel includes an elongate fastener element 5 arranged as a slideway and leaving a slot 8 suitable for co-operating with complementary fastener elements fitted to the pieces of equipment. The fastener element 5 and the side walls 4 of the enclosure are integral with the traffic wall 2, forming therewith a one-piece element made out of a single metal material, in particular steel or any metal alloy such as an aluminum alloy, for example. The honeycomb core 1 is fitted inside the enclosure being adhesively bonded to the inside face 6 of the traffic wall 2, and also against the inside faces 7 of the side walls 4. The support wall 3 is fitted to bear against the edges of the side walls 4, and it is secured thereto in sealed manner, e.g. by adhesive or by welding.

FIGS. 2 to 5 show successive different steps in the fabrication of the panel shown in FIG. 1.

In FIG. 2, a first step consists in machining a plate 9 so as to provide the slideway slot 8 that forms the fastener element 5. An optional step may be performed that consists in providing a protective coating on the outside face of the plate 9 that is to form the outside face of the traffic wall 2 so that the coating covers the outside face of the traffic wall of the panel and the surfaces of the slot 8 constituting the fastener element 5 in continuous manner.

In FIG. 3, the plate 9 is machined to form the side walls 10 and the bottom wall 11 of the fastener element 5. This operation consists in conserving sufficient material around the slot 8 to provide thickness for the walls 10 and 11 of the fastener element 5 that between them define the slot 8 at the end of the machining operation. During the machining step, the side walls 4 of the panel are formed so as to leave the enclosure for receiving the honeycomb core 1.

In FIGS. 4 and 5, the honeycomb 1 presents a housing 12 of shape complementary to the shape of the fastener element 5. The housing 12 is suitable for receiving the fastener element 5 during assembly of the panel, and more particularly while the honeycomb core 1 is being put into place inside the enclosure. In the embodiment shown, the housing 12 is formed by machining in a cellular plate from which the honeycomb core 1 is derived. The honeycomb core 1 is fitted inside the enclosure against the inside face 6 of the traffic wall 2 and secured by adhesive. The support wall 3 of the panel is then fitted to press against the side walls 4 of the panel and is secured by welding so that the enclosure is closed and the honeycomb core 1 is confined inside the traffic wall 2 as extended by the side walls 4.

In FIGS. 6 to 9 successive diagrams illustrate variant implementations of the various operations of fabricating the plate 9 from which a panel of the present invention is formed.

Figure 7:
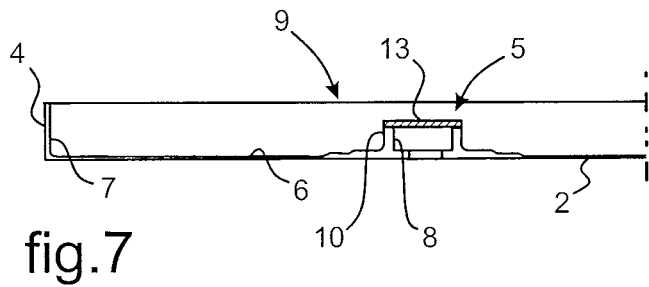

More particularly, in FIGS. 6 and 7, a plate 9 is machined from its inside face opposite from its outside face corresponding to the traffic wall 2 of the panel.

In FIG. 6, various structural members of the panel are formed by removing material during this machining operation:

the side walls 4 of the panel are formed by removing material from the plate 9 so as to define the enclosure for receiving the honeycomb core 1;

the fastener element 5 and the inside face 6 of the enclosure opposite from the traffic wall 2 are formed in the same manner as the implementation shown in FIG. 3. More precisely, this operation consists in leaving side walls 10 for the fastener element 5; and a slot 8 is dug out inside the fastener element 5 from the inside face 6 of the enclosure.

This machining operation is advantageously performed from the same inside face of the plate 9, thereby avoiding any need to turn the plate over as in the implementation shown in FIGS. 2 and 3. In addition, this machining operation can be performed in a single machining pass during which the side walls 4 of the enclosure, a first portion of the inside face 6 of the enclosure, a first side wall 10 of the fastener element 5, the slot 8, a second side wall 10 of the fastener element 5, a second portion of the inside face 6 of the enclosure, and the side wall of the enclosure opposite from the side where the machining operation started are machined in succession.

In FIG. 7, a cap 13 is put into place and bonded, in particular by welding, to the edge face of the fastener element 5. This cap 13 serves to close off the slot 8 in the fastener element 5 in order to isolate the honeycomb core 1 that is to be housed in the enclosure of the panel.

Figure 8:
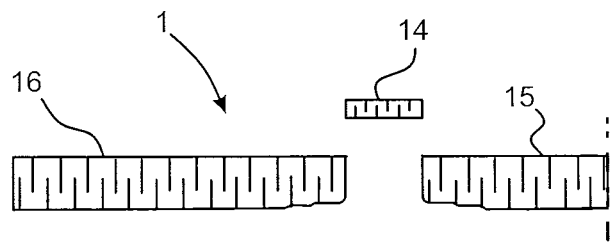
Figure 9:
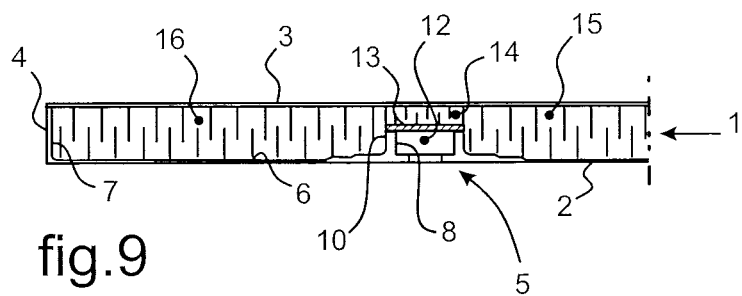

In FIGS. 8 and 9, the honeycomb core 1 of the panel is made up of a plurality of cellular elements 14, 15, and 16 of respective sizes. Juxtaposing the cellular elements beside one another serves to leave the housing that is to receive the fastener element 5. In the embodiment shown, the honeycomb core 1 is made up of three cellular elements 14, 15, 16 that are placed relative to one another in such a manner as to define the housing 12.

A middle first cellular element 14 forms a bottom wall of the housing 12 and it lies between two lateral cellular elements 15 and 16 that provide the side walls of the housing 12. These various cellular elements making up the honeycomb core 1 may for example be bonded to one another before being put into place inside the enclosure, or they may be put into place individually so that they are juxtaposed and then bonded together inside the enclosure prior to welding on the support wall 3.

What is claimed is:

1. A laminated floor panel for a vehicle cabin, the panel comprising:
   a core having a honeycomb structure; and
   a pair of outer metal walls that define an enclosure for receiving the core such that the core is contained between the walls, one of the pair of walls being a "traffic" wall, wherein the traffic wall defines at least one fastener element machined therefrom as a slideway located within a volume defined by the enclosure, the traffic wall and the at least one fastener element formed together from a one-piece unitary block of a single material from which removed matter forms the at least one fastener element;
   wherein the at least one fastener element is positioned inside the panel and is accessible from an outside face of the traffic wall, the at least one fastener element of the traffic wall is configured to cooperate with a complementary fastener element fitted to a piece of vehicle cabin equipment.

2. The floor panel according to claim 1, wherein the traffic wall and the fastener element are integrally formed from a one-piece metal element made of a single material.

3. The floor panel according to claim 1, wherein the traffic wall has a pair of side walls integrally formed therewith and extending therefrom, wherein the fastener element and the side walls are jointly formed in a common machining stage by removing material from the traffic wall.

4. The floor panel according to claim 3, wherein the traffic wall including the side walls further defines the enclosure configured to receive the honeycomb core bonded thereto.

5. The floor panel according to claim 1, wherein the honeycomb core includes a housing for receiving the fastener element of the traffic wall.

6. The floor panel according to claim 5, wherein the housing is formed by machining the honeycomb core.

7. A floor panel according to claim 5, wherein the housing is formed by juxtaposing cellular elements that make up the honeycomb core.

8. The floor panel according to claim 1, wherein the other of the pair of walls is a bottom support wall opposed to the traffic wall and configured to bond with the traffic wall to close the enclosure.

9. The floor panel according to claim 1, wherein the outside face of the traffic wall and an outer surface of the fastener element are respectively covered in a common protective coating of continuous extent.

10. A method of obtaining a vehicle floor panel according to claim 1, in the method comprising:
    providing a plate constituting the traffic wall of the panel; and
    forming the at least one fastener element by removing material from the plate.

11. The method of obtaining a vehicle floor panel according to claim 10, further comprising forming at least one side wall by removing material from the plate, the side walls further defining the enclosure for receiving the honeycomb core.

12. The method of obtaining a vehicle floor panel according to claim 10, wherein forming the at least one fastener element by removing material from the plate further includes:
    removing material from an outer face of the plate corresponding to the outside face of the traffic wall so as to provide a set-back portion in relief constituting the slideway of the at least one fastener element, and
    removing material from an inner face of the plate to form a bottom wall and a pair of side walls of the fastener element, the inner face of the plate opposed from the outer face of the plate.

13. A method of obtaining a vehicle floor panel according to claim 10, wherein the operation of forming the fastener element consists more particularly in:
    removing material from the plate from its inside face to form side walls of the fastener element and to provide a set-back portion in relief forming a slot of the fastener element; and
    closing the slot of the fastener element by fitting a cap that is bonded to the edges of the side walls of the fastener element to form a bottom wall of the fastener element.

14. A laminated floor panel for a vehicle cabin, the panel comprising:
    a honeycomb core;
    a traffic wall having a panel and a peripheral end member extending generally perpendicularly from the panel, the panel having a first side and a second opposed side, wherein the first side of the panel defines a slideway configured to receive a complementary fastener element for a piece of vehicle cabin equipment, wherein the second side and the peripheral end member define a recess sized to receive the honeycomb core; and
    a support wall configured to cooperate with the recess of the traffic wall to form an enclosure for containing the honeycomb core.

15. The laminated floor panel according to claim 14 wherein the slideway is located within a volume defined by the enclosure;
    wherein the traffic wall and the slideway are formed together from a one-piece unitary block of a single material from which removed matter forms the slideway; and
    wherein the first side of the traffic wall provides an outside face for the floor panel such that the slideway is accessible from the outside face.

16. A method of obtaining a vehicle floor panel with a core having a honeycomb structure, and a pair of outer metal walls that define an enclosure for receiving the core such that the core is contained between the walls, one of the pair of walls being a "traffic" wall, the traffic wall defining at least one fastener element machined therefrom as a slideway located within a volume defined by the enclosure, the at least one fastener element positioned to be accessible from an outside face of the traffic wall, the at least one fastener element of the traffic wall configured to cooperate with a complementary fastener element fitted to a piece of vehicle cabin equipment, the method comprising:
    providing a plate constituting the traffic wall of the panel;

forming the at least one fastener element by removing material from the plate; and forming at least one side wall by removing material from the plate, the side walls further defining the enclosure for receiving the honeycomb core.

17. The method of obtaining a vehicle floor panel according to claim 16 wherein forming the at least one fastener element by removing material from the plate further includes:

removing material from an outer face of the plate corresponding to the outside face of the traffic wall so as to provide a set-back portion in relief constituting the slideway of the at least one fastener element, and removing material from an inner face of the plate to form a bottom wall and a pair of side walls of the fastener element, the inner face of the plate opposed from the outer face of the plate.

* * * * *